United States Patent [19]

Serino

[11] 3,747,163
[45] July 24, 1973

[54] CLOSURE OR SEAL FOR DOORS, PACKAGES AND THE LIKE

[76] Inventor: Vincenzo Serino, Via Centuripe No. 34, 00174 Roma, Italy

[22] Filed: June 7, 1971

[21] Appl. No.: 150,369

[30] Foreign Application Priority Data
June 10, 1970 Italy .............................. 51290 A/70

[52] U.S. Cl. ............................ 24/16 PB, 292/307 R
[51] Int. Cl. ........................ B65d 55/06, B65d 63/00
[58] Field of Search ......... 24/16 PB, 16 R, 30.5 PB, 24/150 FP, 206 A, 208 A; 292/307 R; 40/21 C, 304, 305

[56] References Cited
UNITED STATES PATENTS

| | | | |
|---|---|---|---|
| 956,490 | 4/1910 | Frederick | 292/307 R |
| 3,463,532 | 8/1969 | Chidley et al. | 292/307 R |
| 3,600,027 | 8/1971 | Noland | 24/16 PB X |
| 2,554,105 | 5/1951 | Heinle | 24/16 PB UX |

FOREIGN PATENTS OR APPLICATIONS

| | | | |
|---|---|---|---|
| 796,222 | 1/1936 | France | 24/16 PB |
| 1,079,537 | 4/1960 | Germany | 24/30.5 P |

Primary Examiner—Donald A. Griffin
Attorney—Munson & Fiddler

[57] ABSTRACT

A device for locking or sealing doors or other closures or objects, said device consisting of a relatively lengthy strip of metal or other suitable material of substantially square cross sectional shape, said strip being provided at one end with a widened and flattened disk or head having an aperture through it and through which the body of the strip can be passed, said strip being capable of flattening under pressure to enable an enlarged head to be formed on a part of the strip after such part has been passed through the aperture in the head.

1 Claim, 5 Drawing Figures

PATENTED JUL 24 1973　　　　　　　　　　　　　3,747,163
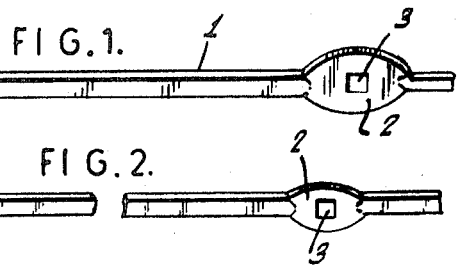
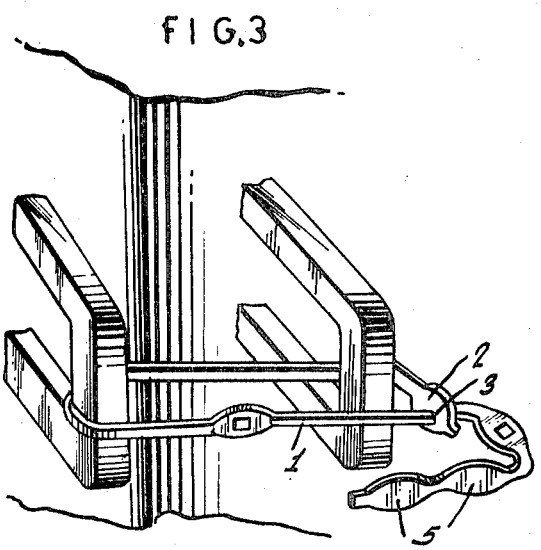
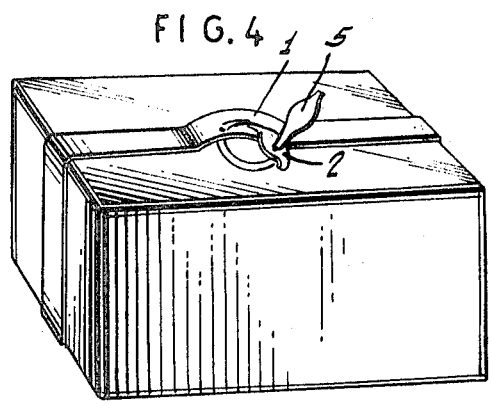
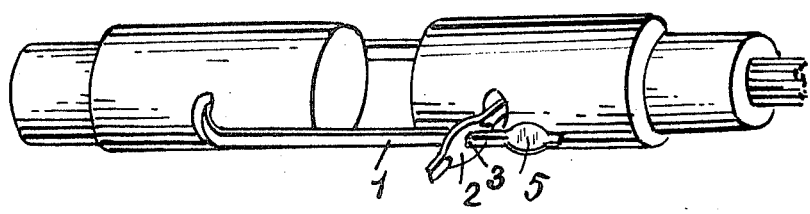

CLOSURE OR SEAL FOR DOORS, PACKAGES AND THE LIKE

The present invention has reference to a closure or sealing strip intended for use upon freight cars, vans, doors, packages or bales or many other objects, and one which will serve as an indicator, showing that the object to which it is applied has not been subjected to tampering.

It is an object of the invention to provide a one-piece article of this character which can be easily and economically made; which can be readily applied as a seal and which cannot be easily broken or detached without indicating that it has been tampered with.

In the accompanying drawing, wherein an illustrative embodiment of the invention is disclosed, FIG. 1 is an elevational view of a closure or seal, constructed according to the invention;

FIG. 2 shows a continuous strip from which a number of the seals can be produced;

FIG. 3 shows the closure seal extended through the clevises of a door and door frame;

FIG. 4 shows how the closure or seal can be applied to the strapping of a package or bale; and FIG. 5 shows the seal used on cables or other cylindrical objects.

Referring to the drawing, one of the seals or closures is indicated at 1, the same being preferably composed of a stiff but bendable metal that is preferably but not necessarily of square or rectangular shape in cross section. For the greater part of its length, the body of the closure or seal consists of a relatively thin and lengthy strip of uniform cross section and provided at one end with a wide, flat tab portion 2. The lengthy part of the strip thus extends as a tail piece from the tab.

Provided through the tab 2 is a hole 3 which is of square shape and a little larger in size than the cross sectional shape of the body 1 of the seal.

The closure or seal can be made singly or in can be produced rapidly and inexpensively by successively cutting the closures from a continuous strip such as is shown in FIG. 2.

The closure or seal is made, as above stated, of square or rectangular shape, but it will be apparent that it might be made in circular or other shape without departing from the spirit of the invention. The closure can, for identification purposes, be made in various colors and the tabs or heads can be variously shaped and bear suitable printed or embossed indicia. The closure may be in single form or or may consist of the number of the units as shown for example in FIG. 3.

In use the closure or seal is inserted through the elements such as the clevises in FIG. 3 for example, and the strip portion is passed through the hole 3 in the tab 2. The strip is of suitable material and by the use of a suitable flattening or compressing tool, the strip can be formed with one or more heads or tabs 5 located beyond the apertured tab 3. These tabs 5 may be of substantially the same size and shape as the tab 2 so that the finished and fitted-on closure would be substantially alike at both of its ends.

By the production of the enlarged head or tab 5 located beyond the apertured tab 2, a closure of loop formation is provided and one which results in the production of a closure or seal which cannot be opened without being broken, defaced or destroyed.

As indicated in FIGS. 3 to 5, the closure or seal can be readily applied to doors, to fastening straps for bales or packages, to cable connectors (FIG. 5) or employed in many other environments.

What I claim is:

1. A closure or seal comprising, an elongated strip of squashable material having a flattened, widened head at one end, said head having a central aperture of greater size than the cross sectional size of the body of the strip so that the body of the strip can be passed through the aperture to form the strip into loop shape, the strip having a part extending beyond the head, said part having a tab portion greater in size than the aperture and substantially of the same shape and size as the head, said tab portion consisting of a compressed, flattened portion of the strip, the strip being of preferably rectangular shape, the aperture in the head being of substantially similar shape, the cross sectional shape of the body of the strip facilitating the flattening of it into the tab portion.

* * * * *